(12) United States Patent
Hsu et al.

(10) Patent No.: US 8,692,915 B2
(45) Date of Patent: Apr. 8, 2014

(54) CORRELATED DOUBLE SAMPLING DEVICE OF IMAGE SENSOR AND METHOD THEREOF

(75) Inventors: Jer-Hao Hsu, Hsinchu County (TW); Chao-Yu Meng, Hsinchu (TW); Wen-Shen Wuen, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 332 days.

(21) Appl. No.: 13/118,488

(22) Filed: May 30, 2011

(65) Prior Publication Data

US 2012/0268638 A1 Oct. 25, 2012

(30) Foreign Application Priority Data

Apr. 22, 2011 (TW) .............................. 100114112 A

(51) Int. Cl.
*H04N 5/335* (2011.01)
*H04N 3/14* (2006.01)

(52) U.S. Cl.
USPC .................... 348/294; 348/241; 250/208.1

(58) Field of Classification Search
USPC .................... 348/241, 294–310; 250/208.1
See application file for complete search history.

(56) References Cited

U.S. PATENT DOCUMENTS

| 5,898,168 | A | 4/1999 | Gowda et al. |
| 7,091,466 | B2 | 8/2006 | Bock |
| 2008/0094494 | A1* | 4/2008 | Lee et al. ....................... 348/294 |
| 2008/0258045 | A1* | 10/2008 | Oike et al. ................. 250/208.1 |
| 2012/0026373 | A1* | 2/2012 | Tay ............................... 348/302 |

OTHER PUBLICATIONS

Gruev et al., Linear Current Mode Imager With Low Fix Pattern Noise, 2004, IEEE.*

* cited by examiner

*Primary Examiner* — Anthony J Daniels
(74) *Attorney, Agent, or Firm* — Jianq Chyun IP Office

(57) ABSTRACT

A correlated double sampling device (CDS device) of an image sensor is provided. The CDS device is coupled to a plurality of light-sensing pixels arranged along a first direction. The CDS device of the image sensor includes a regulator and a sampling circuit. The regulator provides the light-sensing pixels with a first voltage so that at least one of the light-sensing pixels provides a first linear current and a second linear current according to the first voltage. The sampling circuit is coupled between a second voltage and the regulator and includes a first sampling unit and a second sampling unit to respectively receive the first linear current for a first duration and the second linear current for a second duration and to respectively and correspondingly output a first sampling signal and a second sampling signal.

18 Claims, 4 Drawing Sheets

CORRELATED DOUBLE SAMPLING DEVICE OF IMAGE SENSOR AND METHOD THEREOF

CROSS-REFERENCE TO RELATED APPLICATION

This application claims the priority benefit of Taiwan application serial no. 100114112, filed Apr. 22, 2011. The entirety of the above-mentioned patent application is hereby incorporated by reference herein and made a part of this specification.

BACKGROUND OF THE INVENTION

1. Field of the Invention

The invention generally relates to an image sensor, and more particularly, to a sampling device and a sampling method of an image sensor.

2. Description of Related Art

Along with the progress of semiconductor and optoelectronic technology, our lives are currently full of more and more digital cameras, digital monitors or digital video cameras. The photograph apparatus such as digital camera, digital monitor or digital video camera requires a photosensitive component to convert a sensed light signal into an electric signal and then to output the electric signal to a rear-stage circuit for image processing. In general speaking, a photosensitive component is mostly a charge coupled device (CCD) or a CMOS image sensor, in which the CCD has better image quality than that of a photograph apparatus using a CMOS image sensing element.

Currently, several techniques related to the image sensing element are provided. For example, U.S. Pat. No. 7,091,466 discloses an image sensing circuit, which enables a rear-stage circuit to read the electric signals of a plurality of photosensitive components during one time so as to enhance the intensity of the electric signal and make the rear-stage circuit more easily sense the electric signal. However, the scheme requires an additional circuit to achieve the function, and thus the volume of the apparatus and the production cost are increased. In addition, the above-mentioned image sensing circuit has poor anti-thermal-noise capability. Since the electric signal read by the rear-stage circuit thereof is also a non-linear signal, the reading operation is easily affected by noise. In particular, it is unable to add signals linearly when a plurality of photosensitive components are required to be read for one time.

Additionally, U.S. Pat. No. 5,898,168 discloses an image sensing circuit, which utilizes a rear-stage circuit to read the voltage value produced by a photosensitive component according to the light signal. However, when the light signal is too weak so that the voltage value is not high enough, the rear-stage circuit of the image sensing circuit is easy to wrongly read signals. In addition, since the above-mentioned image sensing device provides a voltage value to the rear-stage circuit, it is difficult to read out a plurality of voltage values during one time in circuit implementation, which can make the rear-stage circuit read out a stronger electric signal so as to reduce the probability of the above-mentioned wrongly reading.

SUMMARY OF THE INVENTION

Accordingly, the invention is directed to a correlated double sampling device (CDS device) of an image sensor with good signal-to-noise ratio (SNR).

The invention is also directed to a CDS method of an image sensor with good SNR.

The invention provides CDS device of an image sensor. The CDS device is coupled to a plurality of light-sensing pixels arranged along a first direction. The CDS device of the image sensor includes a regulator and a sampling circuit. The regulator provides the light-sensing pixels with a first voltage so that at least one of the light-sensing pixels provides a first linear current and a second linear current according to the first voltage. The sampling circuit is coupled between a second voltage and the regulator and includes a first sampling unit and a second sampling unit to respectively receive the first linear current for a first duration and the second linear current for a second duration and to respectively and correspondingly output a first sampling signal and a second sampling signal.

In an embodiment of the present invention, each of the light-sensing pixels includes a first transistor, and the first voltage makes an operation interval of the first transistor keep in a linear region so that the first transistor provides the sampling circuit with the first linear current and the second linear current.

In an embodiment of the present invention, the above-mentioned sampling circuit further includes a first switch. The first switch, the first sampling unit and the second sampling unit are coupled in parallel, and the first switch is turned on for a preparing duration and turned off for the first duration and the second duration, in which the preparing duration is prior to the first duration.

In an embodiment of the present invention, the above-mentioned first sampling unit includes a first capacitor and a second switch, and the second switch is coupled between the first capacitor and the regulator.

In an embodiment of the present invention, the above-mentioned second switch is turned on for the preparing duration and the first duration and turned off for the second duration.

In an embodiment of the present invention, the above-mentioned first switch and second switch are turned off for a third duration, in which the third duration is between the first duration and the second duration.

In an embodiment of the present invention, the above-mentioned second sampling unit includes a second capacitor and a third switch, and the third switch is coupled between the second capacitor and the regulator.

In an embodiment of the present invention, the above-mentioned third switch is turned off for the first duration and turned on for the preparing duration and the second duration.

In an embodiment of the present invention, the above-mentioned first switch and third switch are turned off for a third duration, and the third duration is between the first duration and the second duration.

In an embodiment of the present invention, the above-mentioned regulator includes an amplifier and a second transistor. The amplifier has a first input terminal, a second input terminal and an output terminal. The second transistor has a first terminal, a second terminal and a third terminal, in which the first terminal is coupled to the second input terminal, the second terminal is coupled to the sampling circuit and the third terminal is coupled to the output terminal.

In an embodiment of the present invention, the CDS device of the image sensor further includes a reading circuit, which is coupled to the sampling circuit and receives the first sampling signal and the second sampling signal and compares the first sampling signal with the second sampling signal.

In an embodiment of the present invention, the above-mentioned light-sensing pixels decide whether or not simultaneously providing the corresponding first linear currents for the first duration and simultaneously providing the corresponding second linear currents for the second duration according to a control signal.

In addition, the invention also provides a CDS method of an image sensor. The method includes following steps. First, a first voltage is provided to a plurality of light-sensing pixels arranged along a first direction, so that at least one of the light-sensing pixels provides a first linear current and a second linear current according to the first voltage. Next, the first linear current and the second linear current are respectively received for a first duration and a second duration, and a first sampling signal and a second sampling signal are output correspondingly.

In an embodiment of the present invention, each of the light-sensing pixels includes a first transistor, and the method for at least one of the light-sensing pixels to provide the first linear current and the second linear current is to keep an operation interval of the corresponding first transistor in a linear region.

In an embodiment of the present invention, the CDS method of the image sensor further includes turning on a first switch, a second switch and a third switch for a preparing duration and turning off the first switch for the first duration and the second duration.

In an embodiment of the present invention, the method of receiving the first linear current for the first duration is to turn on the second switch and turn off the third switch for the first duration.

In an embodiment of the present invention, the method of receiving the second linear current for the second duration is to turn on the third switch and turn off the second switch for the second duration.

In an embodiment of the present invention, the CDS method of the image sensor further includes turning off the first switch, the second switch and the third switch for a third duration, in which the third duration is between the first duration and the second duration.

In an embodiment of the present invention, the CDS method of the image sensor further includes receiving the first sampling signal and the second sampling signal to perform a reading operation.

In an embodiment of the present invention, the above-mentioned light-sensing pixels decide whether or not simultaneously providing the corresponding first linear currents for the first duration and simultaneously providing the corresponding second linear currents for the second duration according to a control signal.

In addition, the invention also provides an image sensor which includes the above-mentioned CDS device of the image sensor.

Based on the depiction above, in the embodiments of the invention, since the CDS device of the image sensor and the method thereof perform an integration respectively on the first linear current and on the second linear current for two fixed durations to obtain the first sampling signal and the second sampling signal, so that the first sampling signal and the second sampling signal are unlikely interfered by transient noise and thereby the signals with good SNR can be provided.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
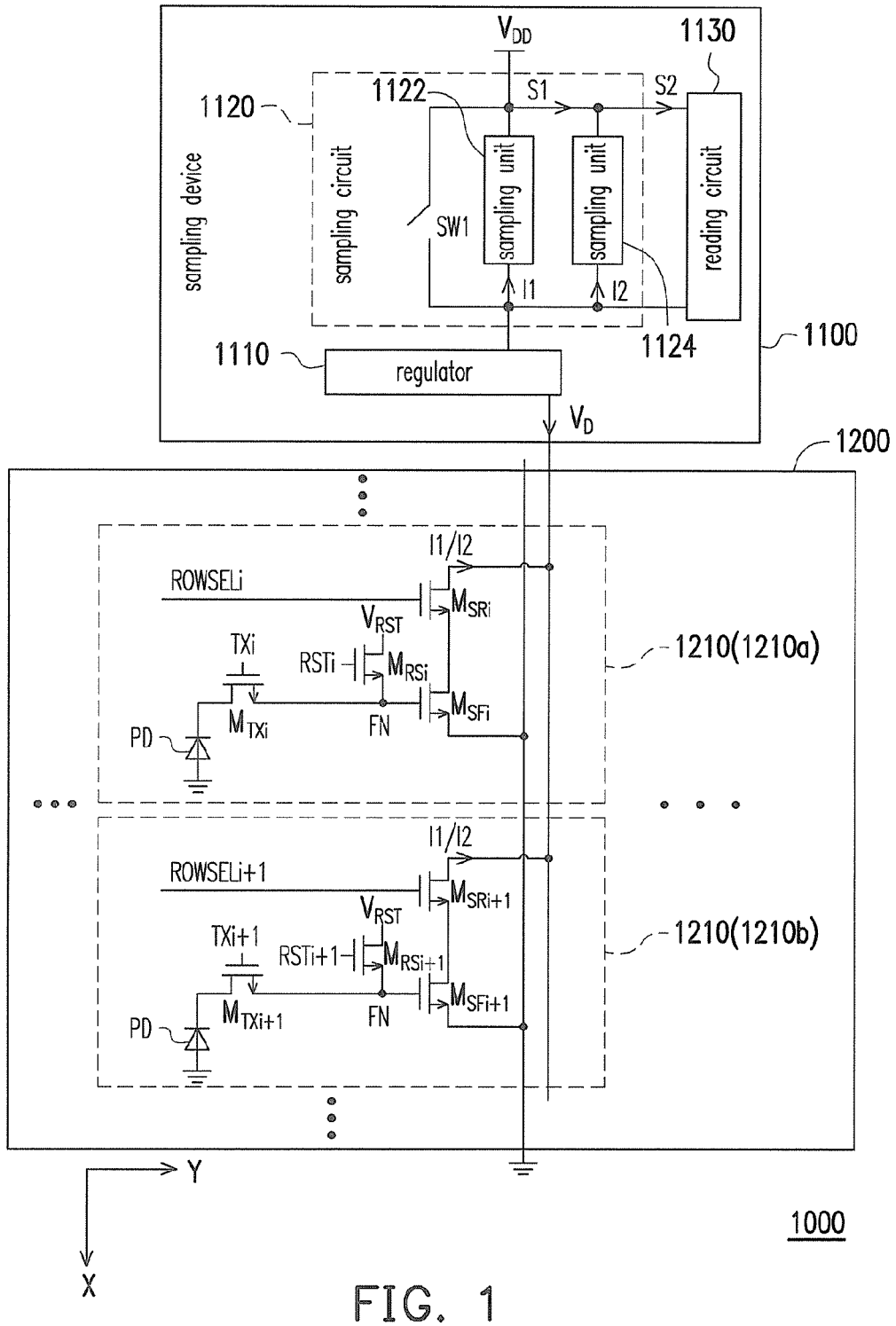
FIG. 1 is a schematic diagram of an image sensor according to an embodiment of the invention.

FIG. 1 is a schematic diagram of an image sensor 1000 according to an embodiment of the invention. Referring to FIG. 1, an image sensor 1000 includes a sampling device 1100 and a light-sensing surface 1200, in which the sampling device 1100 is, for example, a correlated double sampling device (CDS device). As shown in FIG. 1, a plurality of light-sensing pixels 1210 are disposed on the light-sensing surface 1200 arranged along a first direction, in which the first direction is, for example, X direction. In addition, the light-sensing pixels 1210 arranged along the X direction are coupled in series to each other to form a plurality of light-sensing pixels strings. The sampling device 1100 is coupled to the light-sensing pixels 1210 arranged along the X direction. Each of the light-sensing pixels string 1210 has a corresponding sampling device 1100. In more details, when there are five light-sensing pixels strings arranged along the Y direction, there are five sampling devices 1100 respectively corresponding to the light-sensing pixels strings; however, in the embodiment, only one is schematically shown. On the other hand, each of the light-sensing pixels 1210 in the embodiment respectively has a photo diode PD adapted to convert a sensed light signal into an electric signal transmitted to the sampling device 1100, so that the sampling device 1100 can thereby judge the sensed light intensity of the light-sensing pixel 1210.

Continuing referring to FIG. 1, the sampling device 1100 includes a regulator 1110 and a sampling circuit 1120. The regulator 1110 provides a voltage $V_D$ to the light-sensing pixels 1210 so that at least one of the light-sensing pixels 1210 provides two linear currents I1 and I2 according to the voltage $V_D$, in which the values of the linear current I1 and the linear current I2 are related to the light intensity sensed by the photo diode PD. The sampling circuit 1120 is coupled between a voltage $V_{DD}$ and the regulator 1110, and the sampling circuit 1120 includes a sampling unit 1122 and a sampling unit 1124. The sampling unit 1122 and the sampling unit 1124 respectively receive the linear current I1 for a duration T1 and the linear current I2 for a duration T2 and respectively and correspondingly output a sampling signal S1 and a sampling signal S2.

Moreover, each of the light-sensing pixels 1210 includes a first transistor (for example, transistor $M_{SFi}$ or transistor $M_{SFi+1}$), and the voltage $V_D$ makes an operation interval of the first transistor keep in a linear region or a triode region so that the first transistor is able to provide the sampling circuit 1120 with the linear currents I1 and I2. In more details, in the embodiment, the voltage $V_D$ provided by the regulator 1110 falls in a range of less than or equal to ($V_{FN}-V_{th}$) by design, in which $V_{FN}$ is the voltage at a terminal FN and $V_{th}$ is a threshold voltage of the first transistor (for example, the transistor $M_{SFi}$ or $M_{SFi+1}$). When the operation interval of the transistor $M_{SFi}$ or $M_{SFi+1}$ is kept in the linear region, the current flowing out from the drain terminal of the transistor $M_{SFi}$ or $M_{SFi+1}$ has a linear relationship with the voltage so as to form the above-mentioned linear currents I1 and I2.

Continuing referring to FIG. 1, the sampling circuit 1120 of the embodiment further includes a switch SW1. The switch SW1, the sampling unit 1122 and the sampling unit 1124 are coupled in parallel with one another, in which the switch SW1 is turned on for a preparing duration T0 and turned off for the durations T1 and T2, and the preparing duration T0 is prior to the duration T1. The sampling device 1100 of the embodiment further includes a reading circuit 1130, which is coupled to the sampling circuit 1120 and receives the sampling signals S1 and S2 so as to judge the light intensity sensed by the light-sensing pixels 1210. In the embodiment, the reading circuit 1130 is, for example, an analog-to-digital converter (ADC) and the sampling signals S1 and S2 are, for example, voltage signals.

Figure 2:
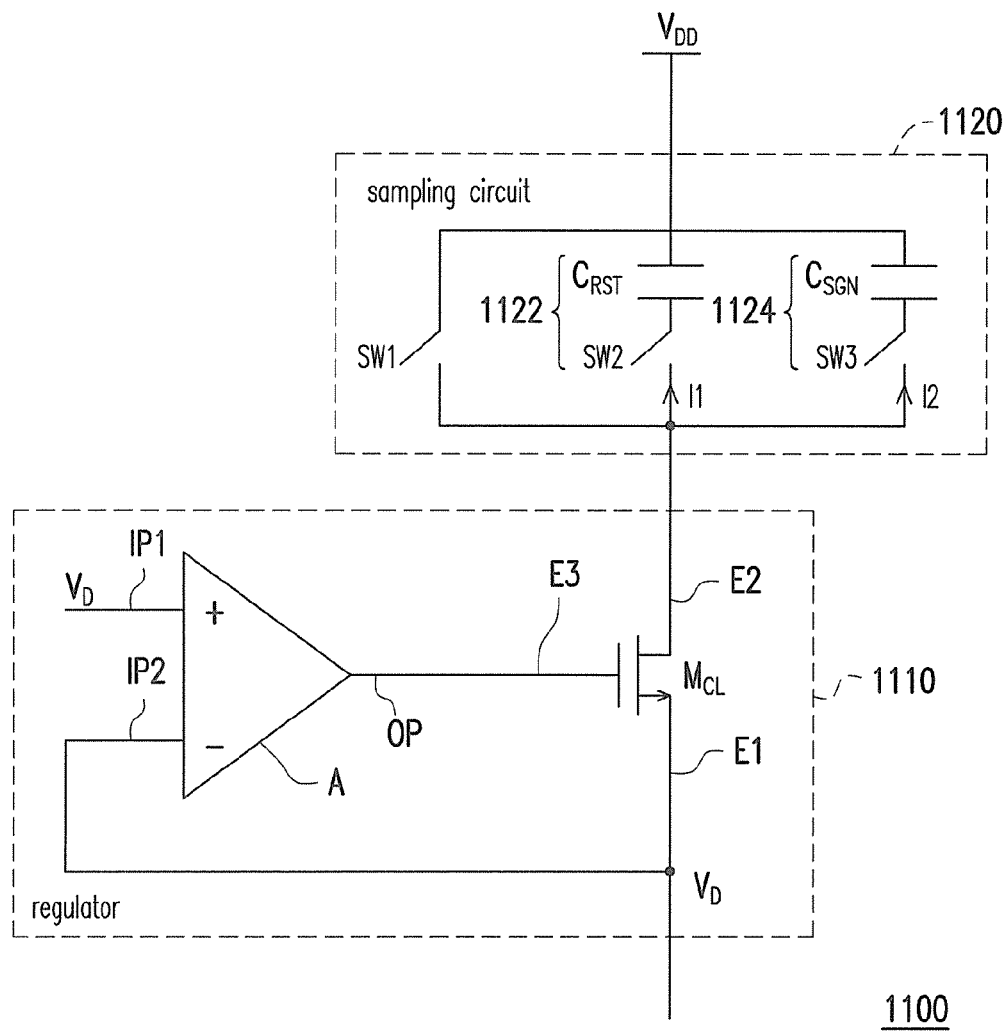
FIG. 2 is a schematic circuit diagram of the sampling device of FIG. 1.

FIG. 2 is a schematic circuit diagram of the sampling device 1100 of FIG. 1. Referring to FIG. 2, the regulator 1110 includes an amplifier A and a transistor $M_{CL}$. The amplifier A has an input terminal IP1, an input terminal IP2 and an output terminal OP, in which the input terminal IP1 is, for example, a positive input terminal and the input terminal IP2 is, for example, a negative input terminal. The transistor $M_{CL}$ has a first terminal E1, a second terminal E2 and a third terminal E3, in which the first terminal E1, the second terminal E2 and the third terminal E3 are, for example, respectively the source, the drain and the gate of the transistor $M_{CL}$. As shown by FIG. 2, the first terminal E1 of the transistor $M_{CL}$ is coupled to the input terminal IP2 of the amplifier A, the second terminal E2 is coupled to the sampling circuit 1120 and the third terminal E3 is coupled to the output terminal OP of the amplifier A. In the embodiment, the input terminal IP1 of the amplifier A is suitable to receive the voltage $V_D$, and the voltage $V_D$ of the input terminal IP1 is coupled to the first terminal E1 of the transistor $M_{CL}$ so that the operation interval of the first transistor in FIG. 1 (for example, the transistor $M_{SFi}$ or $M_{SFi+1}$) is kept in a linear region. On the other hand, the sampling unit 1122 includes a capacitor $C_{RST}$ and a switch SW2, and the switch SW2 is coupled between the capacitor $C_{RST}$ and the regulator 1110. The sampling unit 1124 includes a capacitor $C_{SGN}$ and a switch SW3, and the switch SW3 is coupled between the capacitor $C_{SGN}$ and the regulator 1110. The operation of the sampling device 1100 in the embodiment is described in follows.

Referring to FIGS. 1 and 2, when the sampling device 1100 is to detect the light intensity of a light-sensing pixel 1210a, the switches SW1-SW3 of the sampling device 1100 are firstly turned on for the preparing duration T0 so as to release all residual charges of the capacitor $C_{RST}$ and the capacitor $C_{SGN}$. Then, the sampling device 1100 begins with sampling on the light-sensing pixel 1210a. The sampling device 1100 firstly captures a background signal of the light-sensing pixel 1210a (i.e., the linear current I1) for the duration T1, and then captures a data signal of the light-sensing pixel 1210a (i.e., the linear current I2) for the duration T2. The background signal herein is the signal produced by the light-sensing pixel 1210a under a usual situation and used as a base line, while the data signal is mainly the electric signal produced by the photo diode PD due to receiving a light signal.

In more details, for the duration T1, the switches SW1 and SW3 of the sampling circuit 1120 in FIG. 2 are turned off, but the switch SW2 is turned on. At the time, the signal trace TXi of FIG. 1 has, for example, a logic low-level so as to turn off the transistor $M_{TXi}$. The signal trace RSTi has, for example, a logic high-level so as to turn on the transistor $M_{RSTi}$ and thus the voltage of the terminal FN is raised to $V_{RST}$. In addition, the signal trace ROWSELi has, for example, a logic high-level to turn on the transistor $M_{SRi}$ so that the background signal (i.e., the linear current I1) is transmitted to the sampling unit 1122 through the transistors $M_{SFi}$ and $M_{SRi}$. It should be noted that the voltage $V_D$ provided by the regulator 1110 would make the operation interval of the transistor $M_{SFi}$ keep in a linear region. The capacitor $C_{RST}$ in FIG. 2 performs integration on the linear current I1 for the duration T1; therefore, after the duration T1, the voltage captured by the capacitor $C_{RST}$ of the sampling unit 1122 can be expressed by the following formula:

$$V_{RST\_SAMPLE} = \beta_{MSF}[(V_{RST}-V_{th})V_D-V_D^2/2] \times T1/C_{RST} \qquad (1)$$

in which $V_{RST\_SAMPLE}$ is a across voltage of the capacitor $C_{RST}$ (i.e., the reset sampling voltage), $\beta_{MSF}$ is a current gain of the first transistor (for example, the transistor $M_{SFi}$), $V_{RST}$ is a gate voltage of the first transistor for the duration T1 (i.e., the voltage at the terminal FN) and $V_{th}$ is a threshold voltage of the first transistor. It can be seen from Formula (1) that the reset sampling voltage $V_{RST\_SAMPLE}$ has a linear relationship with the voltage $V_{RST}$. So far, the sampling circuit 1120 has completed the sampling operation on the background signal, in which the reset sampling voltage $V_{RST\_SAMPLE}$ of FIG. 2 is equivalent to the sampling signal S1 of FIG. 1. After that, the sampling circuit 1120 outputs the sampling signal S1 to the rear-stage reading circuit 1130. It should be noted that since in the embodiment, the sampling signal S1 is obtained through the integration for a fixed time (i.e., the duration T1), so that the obtained sampling signal S1 is less affected by transient noise and the sampling device 1100 has better SNR.

Further, the switches SW1-SW3 of the sampling circuit 1120 are turned off for the duration T1'. At the time, the signal traces RSTi and ROWSELi have, for example, logic low-level to turn off the transistor $M_{RSTi}$ and the transistor $M_{SRi}$, and the signal trace TXi has, for example, logic high-level to turn on the transistor $M_{TXi}$ so that the electric signal produced by the photo diode PD due to receiving a light signal can be transmitted to the terminal FN through the transistor $M_{TXi}$, in which the voltage value of the terminal FN is positively proportional to the intensity of the light signal.

Further, the switches SW1 and SW2 of the sampling circuit 1120 of FIG. 2 are turned off and the switch SW3 is turned on for the duration T2. At the time, the signal traces RSTi and TXi have, for example, logic low-level to turn off the transistors $M_{RSTi}$ and $M_{TXi}$. The signal trace ROWSELi has, for example, logic high-level to turn on the transistor $M_{SRi}$, and the voltage of the terminal FN at the time would turn on the transistor $M_{SFi}$ so that the data signal (i.e., the linear current I2) is transmitted to the sampling unit 1124 through the transistors $M_{SFi}$ and $M_{RSTi}$. Similarly, the voltage $V_D$ provided by the regulator 1110 would make the operation interval of the transistor $M_{SFi}$ keep in a linear region. The capacitor $C_{SGN}$ performs integration on the linear current I2 for the duration T2; therefore, after the duration T2, the voltage captured by the capacitor $C_{SGN}$ of the sampling unit 1124 can be expressed by the following formula:

$$V_{SGN\_SAMPLE} = \beta_{MSF}[(V_{SGN}-V_{th})V_D-V_D^2/2] \times T1/C_{SGN} \qquad (2)$$

in which $V_{SGN\_SAMPLE}$ is the across voltage of the capacitor $C_{SGN}$ (i.e., the signal sampling voltage), $\beta_{MSF}$ is the current gain of the first transistor (for example, the transistor $M_{SFi}$), $V_{SGN}$ is the gate voltage of the first transistor for the duration T2 (i.e., the voltage at the terminal FN) and $V_{th}$ is the threshold voltage of the first transistor. It can be seen from Formula (2) that the signal sampling voltage $V_{SGN\_SAMPLE}$ has a linear relationship with the voltage $V_{SGN}$. So far, the sampling circuit 1120 has completed the sampling operation on the data signal, in which the signal sampling voltage $V_{SGN\_SAMPLE}$ of FIG. 2 is equivalent to the sampling signal S2 of FIG. 1. After that, the sampling circuit 1120 outputs the sampling signal S2 to the reading circuit 1130. Similarly, since in the embodiment, the sampling signal S2 is obtained through the integration for a fixed time (the duration T2), so that the obtained sampling signal S2 is less affected by transient noise and the sampling device 1100 has better SNR.

In the embodiment, the sampling device 1100 performs twice samplings in the entire operation, i.e., a sampling operation on the background signal and a sampling operation on the data signal, and the sampling way performed by the sampling device 1100 is known as double sampling.

The above-mentioned formula (1) and the formula (2) are subtracted from each other to obtain a corrected double sampling (CDS) formula:

$$|V_{RST\_SAMPLE} - V_{SGN\_SAMPLE}| = [\tfrac{1}{2}\beta_{MSF}(V_{RST} - V_{SGN}) V_D - V_D^2] \times T1 / C_{SAMPLE} \quad (3)$$

in which the above-mentioned subtracting is performed, for example, by the reading circuit 1130. Since the reset sampling voltage $V_{RST\_SAMPLE}$ (i.e., the sampling signal S1) and the signal sampling voltage $V_{SGN\_SAMPLE}$ (i.e., the sampling signal S2) are respectively the integral value of the background signal (i.e., the linear current I1) and the integral value of the data signal (i.e., the linear current I2), and the data signal is positively proportional to the intensity of the light signal, so that the reading circuit 1130 of the embodiment can determine the intensity of the light signal sensed by the light-sensing pixel 1210a according to the difference value between the reset sampling voltage $V_{RST\_SAMPLE}$ and the signal sampling voltage $V_{SGN\_SAMPLE}$, as shown by formula (3). In addition, since the intensity of the light signal is judged through comparing the background signal with the data signal in the embodiment, so that the effect of noise caused by the environment is eliminated and the probability of wrongly reading of the reading circuit 1130 is accordingly reduced.

The embodiment further provides a pixels-binning function; that is to combine adjacent two or a plurality of light-sensing pixel values into a pixel value so as to advance the light-sensing sensitivity of the image sensor 1000. In the embodiment, as shown in FIG. 1, at least two of the light-sensing pixels 1210 (for example, light-sensing pixels 1210a and 1210b) can decide whether or not to simultaneously provide the sampling circuit 1120 with the corresponding linear currents I1 for the duration T1 and to simultaneously provide the sampling circuit 1120 with the corresponding linear currents I2 for the duration T2 according to a control signal, in which the control signal is, for example, a command sent by a user or produced based on the previous data status. In other words, the sampling circuit 1120 of the embodiment can simultaneously read the electric signals of the adjacent light-sensing pixels 1210a and 1210b so that the sampling circuit 1120 can capture a stronger signal. In this way, even when the intensity of the light signal is insufficient, the reading circuit 1130 is still able to determine the intensity of the light signal received by the light-sensing pixels 1210 at the time.

In more details, after the user sends out a pixels-binning command, the switches SW1 and SW3 of the sampling circuit 1120 are turned off and the switch SW2 is turned on for the duration T1. At the time, the signal traces TXi-TXi+1 have, for example, logic low-level to turn off the transistors $M_{TXi}$-$M_{TXi+1}$; the signal traces RSTi-RSTi+1 have, for example, logic high-level to turn on the transistors $M_{RSTi}$-$M_{RSTi+1}$, and the voltages of the terminals FN of the light-sensing pixels 1210a and 1210b are increased to $V_{RST}$. In addition, the signal traces ROWSELi-ROWSELi+1 have, for example, logic high-level to turn on the transistors $M_{SRi}$-$M_{SRi+1}$ so that the background signals (i.e., the linear current I1) are transmitted to the sampling units 1122 through the transistors $M_{SFi}$-$M_{SFi+1}$ and $M_{SRi}$-$M_{SRi+1}$. Similarly, the voltage $V_D$ provided by the regulator 1110 the operation interval of the transistor $M_{SFi}$ keep in a linear region. The capacitor $C_{RST}$ performs an integration on the linear current I1 for the duration T1; therefore, after the duration T1, the voltage captured by the capacitor $C_{RST}$ of the sampling unit 1122 can be similarly expressed by the formula (1). It should be noted that since at the time, the sampling unit 1122 receives two linear currents I1 to produce the sampling signal S1 so that the sampling signal S1 is stronger, which advances the light-sensing sensitivity of the image sensor 1000. Similarly, since the sampling signal S1 is obtained through the integration for a fixed time (the duration T1) according to the above-mentioned method, so that the obtained sampling signal S1 is less affected by transient noise and the sampling device 1100 has better SNR.

Further, the switches SW1-SW3 of the sampling circuit 1120 are turned off for the duration T1'. At the time, the signal traces RSTi-RSTi+1 and ROWSELi-ROWSELi+1 have, for example, logic low-level to turn off the transistors $M_{RSTi}$-$M_{RSTi+1}$ and $M_{SRi}$-$M_{SRi+1}$; the signal traces TXi-TXi+1 have, for example, logic high-level to turn on the transistors $M_{TXi}$-$M_{TXi+1}$, so that the light signals produced by the two photo diodes PD due to receiving the light signal are transmitted to the terminals FN through the transistors $M_{TXi}$-$M_{TXi+1}$, in which the voltage values of the terminals FN are positively proportional to the intensity of the light signals.

The switches SW1 and SW2 of the sampling circuit 1120 are turned off and the switch SW3 is turned on for the duration T2. At the time, the signal traces RSTi-RSTi+1 and TXi-TXi+1 have, for example, logic low-level to turn off the transistors $M_{RSTi}$-$M_{RSTi+1}$ and $M_{TXi}$-$M_{TXi+1}$; the signal traces ROWSELi-ROWSELi+1 have, for example, logic high-level to turn on the transistors $M_{SRi}$-$M_{SRi+1}$, and the voltages of the terminals FN would turn on the transistors $M_{SFi}$-$M_{SFi+1}$ so that the data signals (two linear currents I2) are transmitted to the sampling unit 1124 through the transistors $M_{SFi}$-$M_{SFi+1}$ and $M_{RSTi}$-$M_{RSTi+1}$. Similarly, the voltage $V_D$ provided by the regulator 1110 makes the operation intervals of the transistors $M_{SFi}$-$M_{SFi+1}$ keep in a linear region. The capacitor $C_{SGN}$ performs an integration on the linear current I2 for the duration T2; therefore, after the duration T2, the voltage captured by the capacitor $C_{SGN}$ of the sampling unit 1124 can be similarly expressed by the formula (2). It should be noted that since at the time, the sampling unit 1124 receives two the linear currents I2 to produce the sampling signal S2 so that the sampling signal S2 is stronger, which advances the light-sensing sensitivity of the image sensor 1000. Similarly, since the sampling signal S2 is obtained through the integration for a fixed time (the duration T2) according to the above-mentioned method, so that the obtained sampling signal S2 is less affected by transient noise and the sampling device 1100 has better SNR.

The transistors $M_{CL}$, $M_{SFi}$-$M_{SFi+1}$, $M_{SRi}$-$M_{SRi+1}$, $M_{RSTi}$-$M_{RSTi-1}$ and $M_{TXi}$-$M_{TXi+1}$ are, for example, NMOS. However, in other embodiments, the transistors $M_{CL}$, $M_{SFi}$-$M_{SFi+1}$, $M_{SRi}$-$M_{SRi-1}$, $M_{RSTi}$-$M_{RSTi-1}$ and $M_{TXi}$-$M_{TXi+1}$ can be PMOS and the logic level of each signal trace can be adjusted according to the types of the transistors, and the invention is not limited to the situation of FIG. 1.

Finally, the two sampling results are compared with each other to obtain a formula similar to formula (3) as follows:

$$|V_{RST\_SAMPLE} - V_{SGN\_SAMPLE}| = \qquad (4)$$

$$\sum_{i}^{i+n} [1/2\beta_{MSF}(V_{RST} - V_{SGN})V_D - V_D^2] \times T1 / C_{SAMPLE}$$

in which n is a positive integer greater than or equal to 1, and n is, for example, 1 in the embodiment. The above-mentioned subtracting is performed, for example, by the reading circuit 1130. It can be seen from formula (4) that the reading circuit 1130 of the embodiment can judge the intensity of the light signal sensed by the light-sensing pixel 1210*a* according to the difference value between the reset sampling voltage $V_{RST\_SAMPLE}$ (i.e., the sampling signal S1) and the signal sampling voltage $V_{SGN\_SAMPLE}$ (i.e., the sampling signal S2). It should be noted that since in the embodiment, multiple rows of light-sensing pixels (for example, light-sensing pixels 1210*a*-1210*b*) are binned to obtain the sampling signals S1 and S2, so that the sampling signals are stronger to advance the light-sensing sensitivity of the image sensor 1000. In addition, since the intensity of the light signal is judged through comparing the background signal with the data signal, so that the effect of noise caused by the environment is eliminated and the probability of wrong reading of the reading circuit 1130 is accordingly reduced. In short, the sampling device 1100 of the embodiment not only provides good SNR, but also has good circuit architecture to facilitate the pixel-binning scheme.

Figure 3:
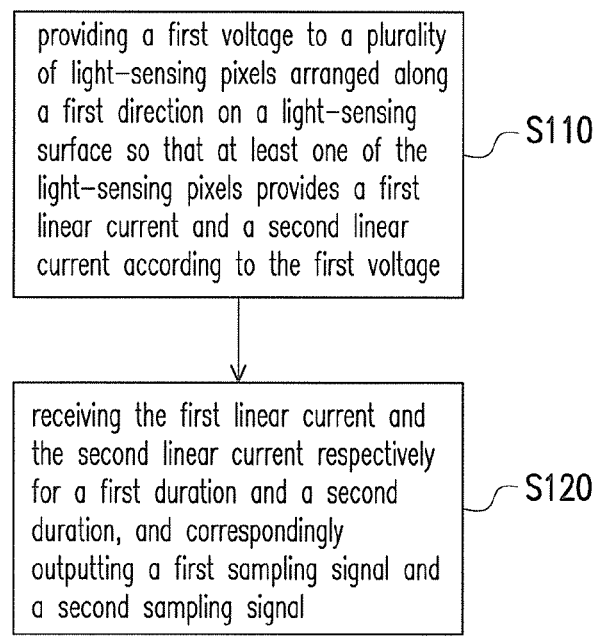
FIG. 3 is a schematic flow chart of a CDS method of an image sensor according to another embodiment of the invention.

FIG. 3 is a schematic flow chart of a CDS method of an image sensor according to another embodiment of the invention. First, a first voltage is provided to a plurality of light-sensing pixels arranged along a first direction on a light-sensing surface so that at least one of the light-sensing pixels provides a first linear current and a second linear current according to the first voltage (step S110), in which the image sensor is, for example, the image sensor 1100 of FIG. 1; the first voltage, the light-sensing surface and the light-sensing pixels are, for example, the $V_D$, the light-sensing surface 1200 and the light-sensing pixels 1210 of FIG. 1; the first direction is, for example, X direction; the first linear current and the second linear current are, for example, the linear current I1 and the linear current I2 of FIG. 1.

Next, the first linear current and the second linear current are received respectively for a first duration and a second duration, and a first sampling signal and a second sampling signal are correspondingly output (step S120), in which the above-mentioned first duration and second duration are respectively the duration T1 and the duration T2 of the previous embodiment, and the first sampling signal and the second sampling signal are respectively, for example, the sampling signal S1 and the sampling signal S2 of FIG. 1.

Figure 4:
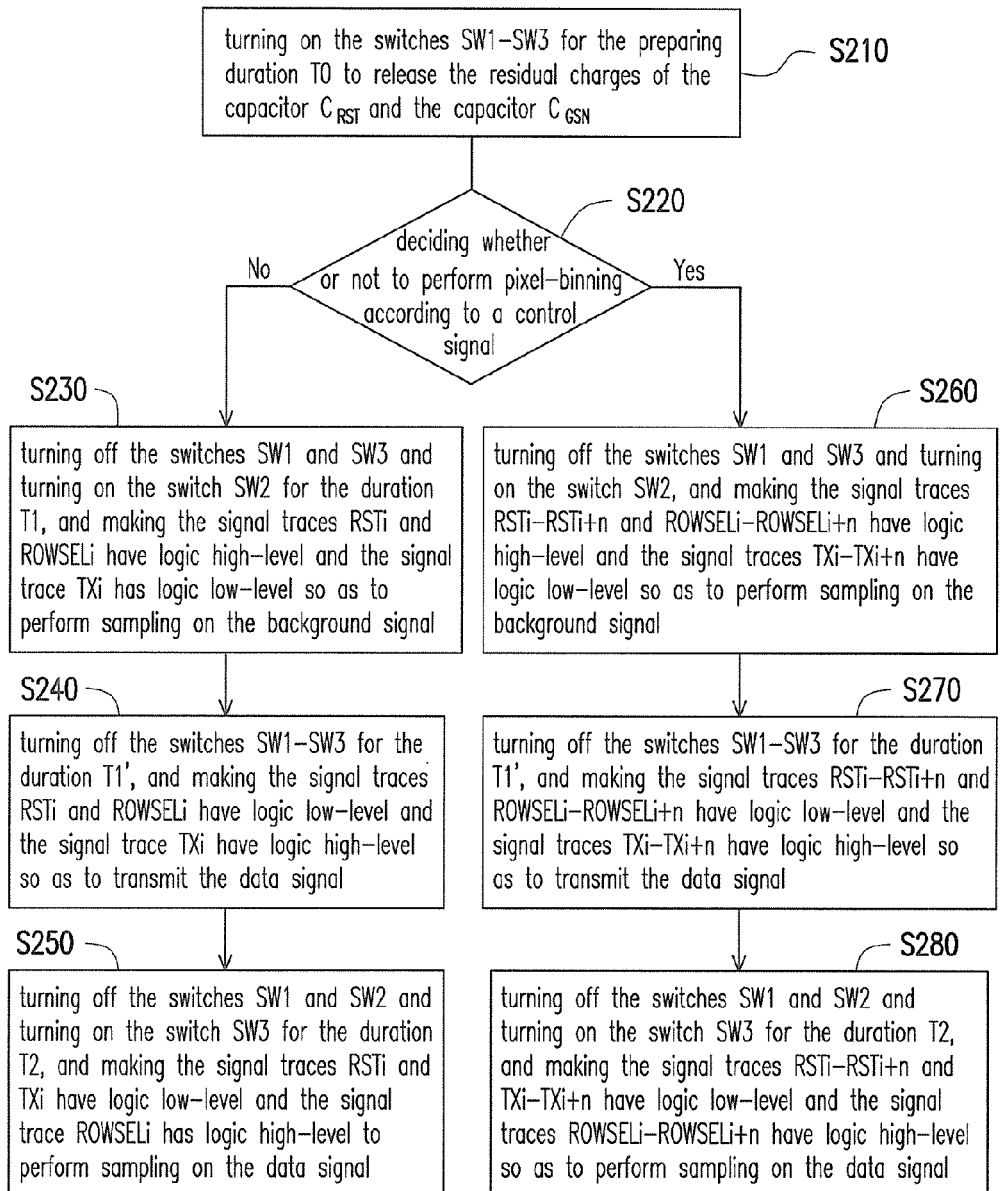
FIG. 4 is a detailed schematic flow chart of the CDS method of FIG. 3.

FIG. 4 is a detailed schematic flow chart of the CDS method of FIG. 3. The method can be implemented by the sampling device 1110 of FIGS. 1 and 2. Referring to FIGS. 2 and 4, first, the switches SW1-SW3 are turned on for the preparing duration T0 to release the residual charges of the capacitor $C_{RST}$ and the capacitor $C_{SGN}$ (step S210). Next, it is decided whether or not to perform pixel-binning according to a control signal (step S220), in which the control signal is a command sent by a user or produced based on the previous data status.

When the pixel-binning operation is not performed, the switches SW1 and SW3 are turned off and the switch SW2 is turned on for the duration T1. At the time, the signal traces RSTi and ROWSELi have logic high-level and the signal trace TXi has logic low-level so as to perform sampling on the background signal (step S230). Then, the switches SW1-SW3 are turned off for the duration T1'. At the time, the signal traces RSTi and ROWSELi have logic low-level and the signal trace TXi has logic high-level to transmit the data signal (step S240). Finally, the switches SW1 and SW2 are turned off and the switch SW3 is turned on for the duration T2. At the time, the signal traces RSTi and TXi have logic low-level and the signal trace ROWSELi has logic high-level to perform sampling on the data signal (step S250). So far, the CDS operation is completed.

On the other hand, when it is to perform pixel-binning operation, the switches SW1 and SW3 are turned off and the switch SW2 is turned on for the duration T1, and the signal traces RSTi-RSTi+n and ROWSELi-ROWSELi+n have logic high-level and the signal traces TXi-TXi+n have logic low-level to perform sampling on the background signal (step S260), in which n is a positive integer greater than or equal to 1, and n is, for example, 1 in the embodiment. Then, the switches SW1-SW3 are turned off for the duration T1'. At the time, the signal traces RSTi-RSTi+n and ROWSELi-ROWSELi+n have logic low-level and the signal traces TXi-TXi+n have logic high-level to transmit the data signal (step S270). Finally, the switches SW1 and SW2 are turned off and the switch SW3 is turned on for the duration T2. At the time, the signal traces RSTi-RSTi+n and TXi-TXi+n have logic low-level and the signal traces ROWSELi-RSTi-RSTi+n have logic high-level to perform sampling on the data signal (step S280). So far, the CDS operation is completed. Since in steps S260-S280, multiple rows of light-sensing pixels (for example, light-sensing pixels 1210*a*-1210*b*) are binned to obtain the sampling signals S1 and S2, so that the sampling signals are stronger to advance the light-sensing sensitivity of the image sensor 1000.

In summary, in the embodiments of the invention, since the CDS device of the image sensor and the method thereof perform the integration operation respectively on the two linear currents for two fixed durations to obtain the corresponding two sampling signals, so that the sampling signals are unlikely interfered by transient noise and thereby the signals with good SNR can be provided by the sampling device. In addition, since the intensity of the light signal is judged through comparing the background signal with the data signal in the embodiments, so that the effect of noise caused by the environment is eliminated and the wrong reading chance of a rear-stage circuit is accordingly reduced. Moreover, since in the sampling device of the embodiment, multiple adjacent light-sensing pixels are binned to obtain the sampling signals, so that the sampling signals are stronger to advance the light-sensing sensitivity of the image sensor.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A correlated double sampling device of an image sensor, coupled to a plurality of light-sensing pixels arranged along a first direction, the correlated double sampling device of the image sensor comprising:
    a regulator, providing the light-sensing pixels with a first voltage so that at least one of the light-sensing pixels provides a first linear current and a second linear current according to the first voltage; and
    a sampling circuit, coupled between a second voltage and the regulator, and comprising a first sampling unit and a second sampling unit to respectively receive the first linear current for a first duration and the second linear current for a second duration and to respectively and correspondingly output a first sampling signal and a second sampling signal, wherein the regulator comprises:
    an amplifier, having a first input terminal, a second input terminal and an output terminal; and
    a second transistor, having a first terminal, a second terminal and a third terminal, wherein the first terminal is coupled to the second input terminal, the second terminal is coupled to the sampling circuit and the third terminal is coupled to the output terminal.

2. The correlated double sampling device of the image sensor as claimed in claim 1, wherein each of the light-sensing pixels comprises a first transistor, and the first voltage makes an operation interval of the first transistor keep in a linear region so that the first transistor provides the sampling circuit with the first linear current and the second linear current.

3. The correlated double sampling device of the image sensor as claimed in claim 1, wherein the sampling circuit further comprises a first switch, and the first switch, the first sampling unit, and the second sampling unit are coupled in parallel, and the first switch is turned on for a preparing duration and turned off for the first duration and the second duration, wherein the preparing duration is prior to the first duration.

4. The correlated double sampling device of the image sensor as claimed in claim 3, wherein the first sampling unit comprises a first capacitor and a second switch, and the second switch is coupled between the first capacitor and the regulator.

5. The correlated double sampling device of the image sensor as claimed in claim 4, wherein the second switch is turned on for the preparing duration and the first duration and turned off for the second duration.

6. The correlated double sampling device of the image sensor as claimed in claim 5, wherein the first switch and second switch are turned off for a third duration, wherein the third duration is between the first duration and the second duration.

7. The correlated double sampling device of the image sensor as claimed in claim 3, wherein the second sampling unit comprises a second capacitor and a third switch, and the third switch is coupled between the second capacitor and the regulator.

8. The correlated double sampling device of the image sensor as claimed in claim 7, wherein the third switch is turned off for the first duration and turned on for the preparing duration and the second duration.

9. The correlated double sampling device of the image sensor as claimed in claim 8, wherein the first switch and third switch are turned off for a third duration, wherein the third duration is between the first duration and the second duration.

10. The correlated double sampling device of the image sensor as claimed in claim 1, further comprising a reading circuit, coupled to the sampling circuit and receiving the first sampling signal and the second sampling signal and comparing the first sampling signal with the second sampling signal.

11. The correlated double sampling device of the image sensor as claimed in claim 1, wherein the light-sensing pixels decide whether or not simultaneously providing the corresponding first linear currents for the first duration and simultaneously providing the corresponding second linear currents for the second duration according to a control signal.

12. A correlated double sample method of an image sensor, comprising:
    providing a plurality of light-sensing pixels arranged along a first direction with a first voltage, so that at least one of the light-sensing pixels provides a first linear current and a second linear current according to the first voltage;
    respectively receiving the first linear current for a first duration and the second linear current for a second duration and outputting a first sampling signal and a second sampling signal correspondingly;
    turning on a first switch, a second switch and a third switch for a preparing duration; and
    turning off the first switch for the first duration and the second duration.

13. The correlated double sampling method of the image sensor as claimed in claim 12, wherein each of the light-sensing pixels comprises a first transistor, and the method for at least one of the light-sensing pixels to provide the first linear current and the second linear current is to keep an operation interval of the corresponding first transistor in a linear region.

14. The correlated double sampling method of the image sensor as claimed in claim 12, wherein the method of receiving the first linear current for the first duration is to turn on the second switch and turn off the third switch for the first duration.

15. The correlated double sampling method of the image sensor as claimed in claim 14, wherein the method of receiving the second linear current for the second duration is to turn on the third switch and turn off the second switch for the second duration.

16. The correlated double sampling method of the image sensor as claimed in claim 15, further comprising turning off the first switch, the second switch and the third switch for a third duration, wherein the third duration is between the first duration and the second duration.

17. The correlated double sampling method of the image sensor as claimed in claim 12, further comprising receiving the first sampling signal and the second sampling signal to perform a reading operation.

18. The correlated double sampling method of the image sensor as claimed in claim 12, wherein the light-sensing pixels decide whether or not simultaneously providing the corresponding first linear currents for the first duration and simultaneously providing the corresponding second linear currents for the second duration according to a control signal.

* * * * *